No. 818,054.

PATENTED APR. 17, 1906.

W. T. SEARS.
VALVE.
APPLICATION FILED APR. 17, 1905.

Witnesses:
Geo. S. Gaylord
John Enders

Willard Thomas Sears Inventor.
By James W. See
Atty

UNITED STATES PATENT OFFICE.

WILLARD THOMAS SEARS, OF PHILADELPHIA, PENNSYLVANIA, ASSIGNOR TO NILES-BEMENT-POND COMPANY, OF JERSEY CITY, NEW JERSEY.

VALVE.

No. 818,054.  Specification of Letters Patent.  Patented April 17, 1906.

Application filed April 17, 1905. Serial No. 255,888.

*To all whom it may concern:*

Be it known that I, WILLARD THOMAS SEARS, a citizen of the United States, residing in Philadelphia, Philadelphia county, Pennsylvania, (post-office address, Twenty-first and Callowhill streets, Philadelphia, Pennsylvania,) have invented certain new and useful Improvements in Valves, of which the following is a specification.

This invention, pertaining to improvements in valves, will be readily understood from the following description, taken in connection with accompanying drawings, in which—

Figure 1:
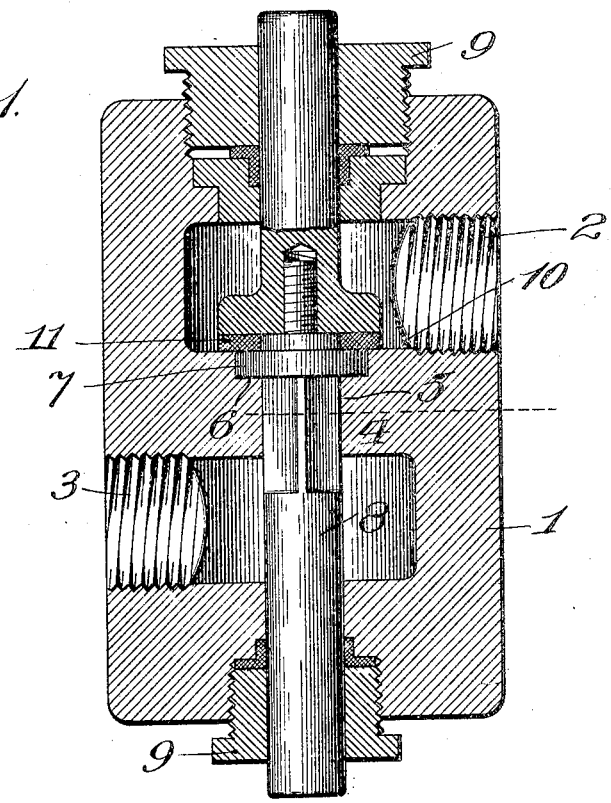
Figure 2:
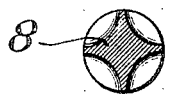

Figure 1 is a vertical diametrical section of a valve construction exemplifying my invention; Fig. 2, a horizontal section through the stem of the valve.

In valves designed for use with liquids at high pressure—say in excess of one thousand pounds per square inch—a serious annoyance arises from the difficulty of keeping the valves tight upon their seats, foreign matters having a very serious cutting effect upon the contact-surfaces at these high pressures. If relief be sought in the substitution of leather or a like material about the contacting surfaces, then the leather is found to be not durable.

By means of my invention I so combine metal to metal contacts and leather to metal contacts that I secure a tight and easily-maintained valve.

In the drawings, 1 indicates the valve-body, which may be of any ordinary form; 2, the inlet thereto; 3, the outlet therefrom; 4, the usual partition between the inlet and the outlet; 5, an opening through this partition and forming, when opened by the valve, the communication between the inlet and outlet; 6, a seat formed in a counterbore of the opening 5; 7, the valve closing downwardly upon this seat and held to the seat by the pressure from the inlet 2; 8, the stem of the valve, this stem being fluted where it passes through the partition 4, so that the stem of itself at no time prevents free flow of water through the partition from below portion 7 of the valve; 9, stuffing-boxes at projecting portions of the valve-stem; 10, a valve-seat supplementary to seat 6; 11, a disk of leather or similar material secured below a flange on the stem of the valve and adapted to close down on supplementary seat 10.

It will be recognized that in the absence of leather packing 11 the portion 7 of the valve would close upon seat 6, and the valve would become an ordinary metal-to-metal valve and subject to its objections of leaking as the result of the cutting so frequently taking place under the high pressure in question. Again, if valve portion 6 be omitted then the closure would be effected entirely by the seating of packing 11 upon the seat 10, and there would be presented the conditions of an ordinary leather-faced valve and subject to its objections as to lack of durability under the high pressure in question; but with the complete arrangement, as illustrated in the drawings, the two seating portions supplement each other, the metal-to-metal contact between parts 7 and 6 performing either completely or in case of cutting up to its capacity, while the leather to-to-metal portions 11 and 10 furnish the tighter seating due to the diversity of the material, the metal-to-metal contact serving to prevent excessive strain on the leather packing, the result being a valve having the durability of metallic parts combined with the tightness incident to using a soft part.

The part 7 should fit in its counterbore with a fair degree of tightness, so that there is no liberal flow of liquid until the portion 7 has lifted from the counterbore, the result being that the leather packing is not subjected to the cutting action of the flow of liquid until it has risen so far above its seat 10 that the result will not be damaging.

Analysis of the invention will show that the stated important results are accomplished without interfering with the prompt action of the valve in closing. It is believed that this general result is new and that heretofore no valve has been produced suited for prompt action under the high pressures employed in the hydraulic press which would combine tightness with long life. It is to be observed that the space between seat 6 and the lower surface of portion 7 is always in free communication with the opening 5, resulting from the fluting of the stem 8 where it passes through the partition 4, the result being that when portion 7 enters the counterbore of the seat and while it is descending in that counterbore and at all times till it is arrested against seat 6 there is no imprisonment of water to restrain the closing movement of the valve.

I claim as my invention—

In a valve, the combination, substantially as set forth, of a valve-body having an inlet and an outlet, a partition in the valve-body between the inlet and the outlet and provided with an opening, said opening being margined by concentric metallic valve-seats, a metallic valve fitted to play in said opening and seat upon one of said valve-seats and close the opening, a free passage being provided for the flow of liquid from between said metallic valve and its seat during the entire closing movement of the valve, and a packing of leather or similar material carried by said valve and adapted to seat upon the other valve-seat and form a supplementary closure for said opening when the metallic valve reaches its own seat.

WILLARD THOMAS SEARS.

Witnesses:
 R. RAYMOND PORTER,
 WILLIAM MCLAUGHLIN.